(12) United States Patent
Baranwal et al.

(10) Patent No.: US 10,592,634 B1
(45) Date of Patent: Mar. 17, 2020

(54) SYSTEMS AND METHODS FOR AUTOMATIC HANDLING OF ENGINEERING DESIGN PARAMETER VIOLATIONS

(71) Applicant: Ansys, Inc., Canonsburg, PA (US)

(72) Inventors: Ajay Baranwal, Dublin, CA (US); Norman Chang, Fremont, CA (US)

(73) Assignee: Ansys, Inc., Canonsburg, PA (US)

(*) Notice: Subject to any disclaimer, the term of this patent is extended or adjusted under 35 U.S.C. 154(b) by 8 days.

(21) Appl. No.: 15/983,119

(22) Filed: May 18, 2018

Related U.S. Application Data

(60) Provisional application No. 62/515,805, filed on Jun. 6, 2017.

(51) Int. Cl.
  *G06F 17/50* (2006.01)
  *G06N 3/08* (2006.01)
  *G06N 3/04* (2006.01)

(52) U.S. Cl.
  CPC ......... *G06F 17/5081* (2013.01); *G06N 3/04* (2013.01); *G06N 3/08* (2013.01); *G06F 2217/02* (2013.01)

(58) Field of Classification Search
  CPC .................................. G06F 17/5081
  USPC ........................................ 716/112
  See application file for complete search history.

(56) References Cited

U.S. PATENT DOCUMENTS

| | | | | |
|---|---|---|---|---|
| 7,506,277 B1* | 3/2009 | Arora | ............... | G06F 17/5081 716/122 |
| 9,026,970 B2* | 5/2015 | Danti | ............... | G06F 17/5081 716/112 |
| 2004/0049745 A1* | 3/2004 | Rahman | ............ | G06F 17/5036 716/112 |
| 2005/0188336 A1* | 8/2005 | Mortensen | ......... | G06F 17/5022 716/106 |
| 2010/0064269 A1* | 3/2010 | Lai | .................. | G06F 17/5081 716/107 |
| 2010/0070936 A1* | 3/2010 | Lakshmanan | ...... | G06F 17/5081 716/136 |
| 2010/0257496 A1* | 10/2010 | Ferguson | ........... | G06F 17/5081 716/112 |
| 2012/0072878 A1* | 3/2012 | Dittmann | ............ | G06F 17/504 716/112 |
| 2012/0167028 A1* | 6/2012 | Ferguson | ........... | G06F 17/5081 716/112 |
| 2012/0297352 A1* | 11/2012 | Filippi | ............... | G06F 17/5081 716/112 |

(Continued)

*Primary Examiner* — Suresh Memula
(74) *Attorney, Agent, or Firm* — Jones Day

(57) ABSTRACT

Systems and methods are provided for reducing processing time of an automated engineering design. A repository of engineering design rule violations and corresponding waiver decisions regarding the design rule violations is accessed. A clustering operation is performed on violations in the repository to form clusters of violations based on one or more characteristics of the violations. Waiver decisions associated with violations in each cluster are evaluated to assign a risk level to each cluster. A plurality of detected engineering design rule violations associated with an engineering design are identified. Each of the detected violations is iterated through to determine which cluster that detected violation belongs. Detected violations associated with low risk clusters are automatically to approve the engineering design.

20 Claims, 8 Drawing Sheets

(56) References Cited

U.S. PATENT DOCUMENTS

| | | | | |
|---|---|---|---|---|
| 2013/0132918 A1* | 5/2013 | Ferguson | ............ | G06F 17/5081 716/112 |
| 2013/0263074 A1* | 10/2013 | Ferguson | ............ | G06F 17/5081 716/112 |
| 2015/0095865 A1* | 4/2015 | Bhattacharya | ...... | G03F 7/70466 716/112 |
| 2017/0357807 A1* | 12/2017 | Harms | .................. | G06N 20/00 |
| 2018/0060702 A1* | 3/2018 | Ma | ...................... | G06K 9/6269 |
| 2018/0096093 A1* | 4/2018 | Graur | .................. | G06F 17/5081 |
| 2019/0213733 A1* | 7/2019 | Yati | ...................... | G06N 20/00 |

\* cited by examiner

| Feature A | Actual Cause Yes | Actual Cause No |
|---|---|---|
| Predicted Cause Yes | True Positive | False Positive |
| Predicted Cause No | False Negative | True Negative |

Recall = TP/(TP+FN)
Precision = TP/(TP+FP)

FIG.8

SYSTEMS AND METHODS FOR AUTOMATIC HANDLING OF ENGINEERING DESIGN PARAMETER VIOLATIONS

CROSS-REFERENCE TO RELATED APPLICATIONS

This application claims priority to U.S. Provisional Application No. 62/515,805, filed Jun. 6, 2017, entitled "Systems and Methods for Automatic Handling of Engineering Design Parameter Violations," which is incorporated herein by reference in its entirety.

TECHNICAL FIELD

The present invention relates to engineering design, and more specifically, to systems and methods related to automated design parameter evaluation.

BACKGROUND

Engineering design rules provide parameters that form a guide for producing an engineering design that functions properly. A design (e.g., an electric circuit, a physical apparatus) that meets the parameters of the engineering design rules can be built under the assumption that it will function properly. In reality, engineering design rules are often based on "worst-case scenarios," where the rules are set to be overly restrictive—providing a buffer over what is actually necessary to build a successful product. Over time, the magnitude of that buffer is deduced, wherein designers can ignore some design rules in some instances, allowing for a more efficient design (e.g., a smaller, more power efficient electrical circuit) that still operates properly. As designers become more aggressive in their designs, the number of engineering design rule violations can reach into the millions. While some of those violations are important (e.g., they could impact manufactured product performance), many others can be ignored. Manually iterating through potentially large numbers of engineering design rule violation alerts can be extremely time consuming.

SUMMARY

Systems and methods are provided for reducing processing time of an automated engineering design. A repository of engineering design rule violations and corresponding waiver decisions regarding the design rule violations is accessed. A clustering operation is performed on violations in the repository to form clusters of violations based on one or more characteristics of the violations. Waiver decisions associated with violations in each cluster are evaluated to assign a risk level to each cluster. A plurality of detected engineering design rule violations associated with an engineering design are identified. Each of the detected violations is iterated through to determine which cluster that detected violation belongs. Detected violations associated with low risk clusters are automatically to approve the engineering design.

As another example, a system for reducing processing time of an automated engineering design includes one or more data processors and a computer-readable medium encoded with instructions for commanding the one or more data processors to execute steps of a method. In the method, a repository of engineering design rule violations and corresponding waiver decisions regarding the design rule violations is accessed. A clustering operation is performed on violations in the repository to form clusters of violations based on one or more characteristics of the violations. Waiver decisions associated with violations in each cluster are evaluated to assign a risk level to each cluster. A plurality of detected engineering design rule violations associated with an engineering design are identified. Each of the detected violations is iterated through to determine which cluster that detected violation belongs. Detected violations associated with low risk clusters are automatically to approve the engineering design.

As a further example, a computer-readable medium is encoded with instructions for commanding one or more data processors to execute steps of a method for reducing processing time of an automated engineering design. In the method, a repository of engineering design rule violations and corresponding waiver decisions regarding the design rule violations is accessed. A clustering operation is performed on violations in the repository to form clusters of violations based on one or more characteristics of the violations. Waiver decisions associated with violations in each cluster are evaluated to assign a risk level to each cluster. A plurality of detected engineering design rule violations associated with an engineering design are identified. Each of the detected violations is iterated through to determine which cluster that detected violation belongs. Detected violations associated with low risk clusters are automatically to approve the engineering design.

BRIEF DESCRIPTION OF THE DRAWINGS

FIG. 8 is a diagram depicting an example confusion matrix.

DETAILED DESCRIPTION

Engineering design projects (e.g., engineering design projects facilitated by automated engineering design software that outputs an engineering design for physical fabrication or building) are often associated with design rules. These "rules of thumb" are typically created to confidently create designs that will result in successful output products through the incorporation of buffers from known design issues into the rules. When using engineering design software, the software will typically compare an engineering design (e.g., a design inputted or imported by an engineer) to the design rules to determine whether the engineering design is in compliance with the rules. When a design is not in compliance with the rules, a warning is raised to the engineer. The engineer considers the warning and whether the engineering should be adjusted (e.g., to maintain the buffer built into the design rules) or whether the design rule violation can be waived.

Figure 1:
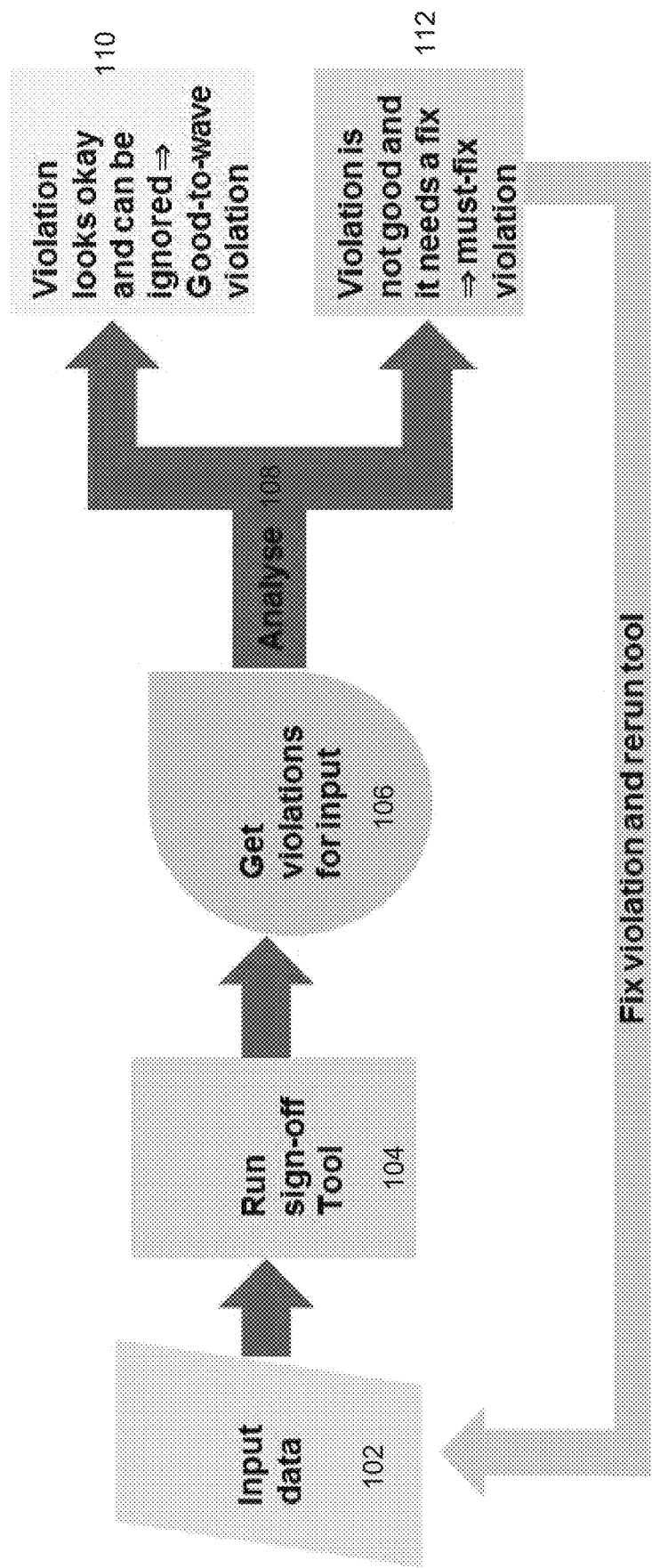
FIG. 1 is a block diagram depicting an engineering design software algorithm for evaluating design rule violations.

FIG. 1 is a block diagram depicting an engineering design software algorithm for evaluating design rule violations. An engineering design is inputted into the design software or is imported from an identified location. A sign-off tool is executed at 104 that applies engineering design rules to the engineering design to identify a set of design rule violations, as indicated at 106. Warnings associated with rule violations are presented to the engineer at 108, where the engineer takes one of two paths. If the warning is deemed to be spurious, or if the engineer thinks that a successful design can still be achieved, even with the indicated engineering design rule being violated, then the engineer can waive the violation, as indicated at 110. If the rule violation is deemed to be of concern (e.g., the violation is a serious violation, the waiving of too many violations may have eroded the engineering buffer to an unacceptable level), then the engineer fixes the engineering design at 112 by providing new input 102. The sign-off tool 104 can then be re-executed to identify remaining violations 106.

As engineers become more comfortable with waiving design rule violations (e.g., as a design technique becomes more mature and engineers become more comfortable with the types of rule violations that can be waived), the number of violations associated with projects can increase dramatically. For example, in an electronic circuit design implementation, engineering design rules can be associated with electromigration mitigation. In wires having high currents relative to their size (e.g., their cross-sectional area and length), collisions between travelling electrons and atoms of the wire can occur. Over a large number of collisions, properties of a wire can change, with wire atoms migrating toward a downstream portion of the wire. Over time, this can result in physical damage to a wire, including creation of open circuit conditions. To combat the effects of electromigration, engineering design rules can be put in place that require certain wire characteristics (e.g., cross-sectional area) depending on the current that is expected to occur in those wires (e.g., as determined by circuit simulation). In electronic circuits including millions of wire segments, an aggressive circuit design can easily result in millions of design rule violations.

Manually iterating through thousands, if not millions, of design rule violations is generally not feasible and can limit or eliminate the attractiveness of engineering design aids. Design rules could be relaxed or eliminated, but that may not be desirable in many instances, where knowledge of where design rules can be ignored and where they should be addressed is often a matter of significant experience and engineering finesse that is not applicable in all situations. A system that enables automatic waiving of certain design rule violations (e.g., in a manner that is consistent with past waivers by engineers) can significantly automate the design process by indicating the design rule violations that are likely most important to the engineer, while automatically waiving those that have historically been shown to be less critical.

Figure 2:
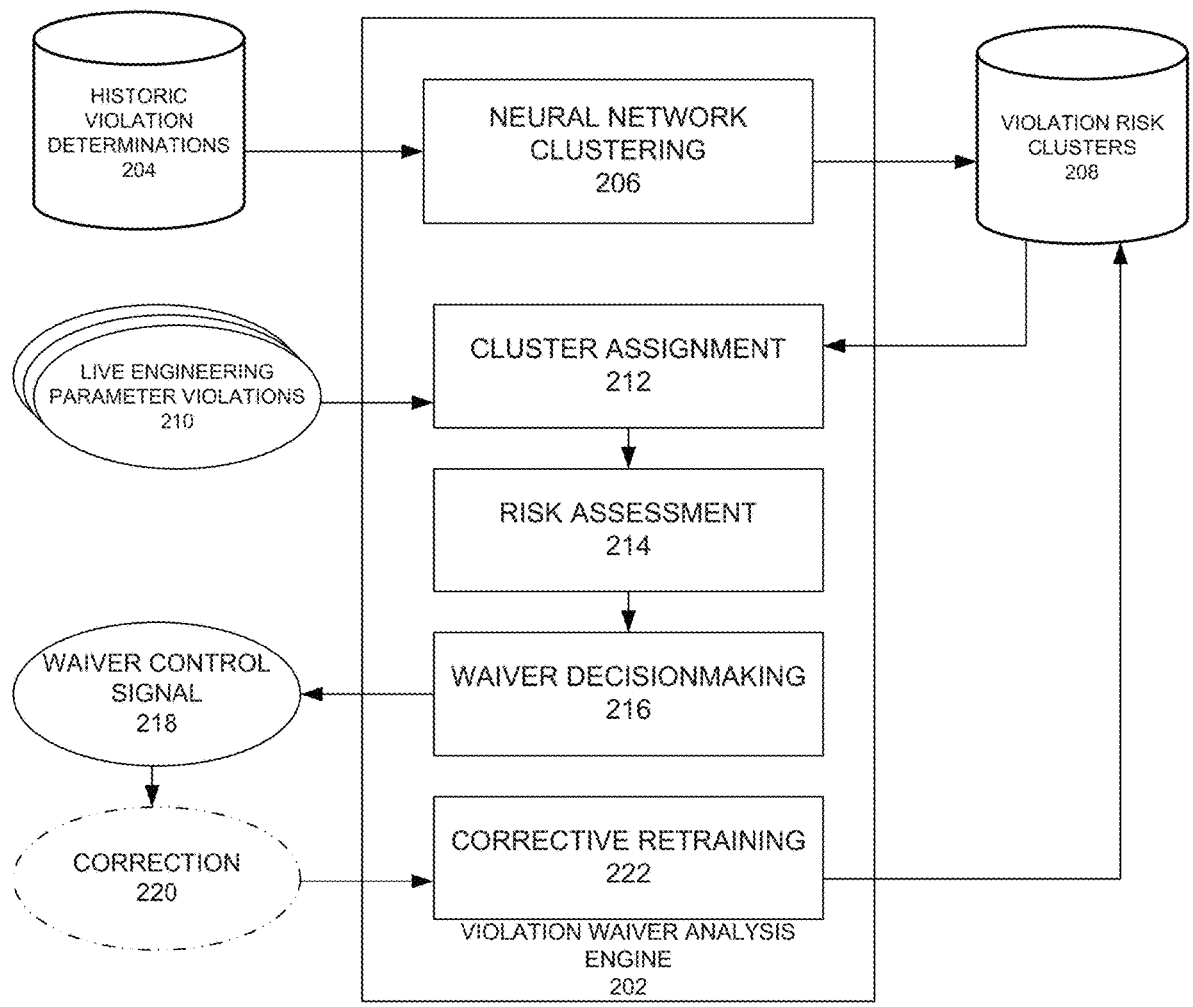
FIG. 2 is a block diagram depicting a processor-implemented engineering design rule violation waiver analysis engine.

FIG. 2 is a block diagram depicting a processor-implemented engineering design rule violation waiver analysis engine 202. The violation waiver analysis engine 202 accesses a repository of historic violation determinations 204. That repository contains details of individual engineering design rule violations (e.g., the design rule violated, the circumstances of the violation, by how much the rule was violated) and a violation waiver decision associated with that violation (i.e., did the engineer waive the violation or did the engineer adjust the design to address the violation). The violation waiver analysis engine 202 performs clustering (e.g., K-means clustering with aid of a neural network) of those historic determinations 204 to generate a model for evaluating future design rule violations to determine whether those future violations can be waived. The clustering operation at 206 generates an identification of a plurality of violation clusters (e.g., characteristics of violations in those clusters, a risk level based on how often violations in those clusters were waived), which are stored in a repository as indicated at 208.

The violation risk clusters 208 are then used in live engineering design to determine whether engineering rule violations can be automatically waived or whether a particular violation should be presented to an engineer for consideration. A plurality of rule parameter violations are received at 210. Characteristics of a received violation 210 are analyzed to determine which cluster from 208 the received violation 210 is most similar. A risk level associated with that cluster is evaluated at 214, alone or in combination with other factors, to determine a level of risk associated with the current violation 210. A decision is then made at 216 of whether the current violation 210 can be automatically waived, with a signal being output at 218 (e.g., to a module that identifies design rule violations, such that the received violation 210 is not presented to the engineer).

In some implementations, the model formed by the violation risk clusters 208 is continually refined based on corrections made by the engineer or other personnel. For example, when a violation is automatically waived, and the engineer determines that automatic waiver was in error and adjusts the design, that correction 220 is noted, possibly as a serious error, where the characteristics of that erroneous waiver and its underlying rule violation are used to correctively retrain the model at 222. As another example, when an engineer is presented a rule violation and waives that violation, that correction is treated as an error, typically as a much less serious error than an improper waiver, and is used for further refining of the model by the corrective retraining module 222.

Design rule violations, as described herein, can be analyzed in a multitude of engineering and scientific environments. For example, design rules can be associated with circuit timing, where timing of certain operations in different portions of a circuit can be limited to account for possible capacitive propagation delays (e.g., critical path timing violations). In another example, engineering design rule violations can be associated with dynamic voltage drops in a circuit.

Figure 3:
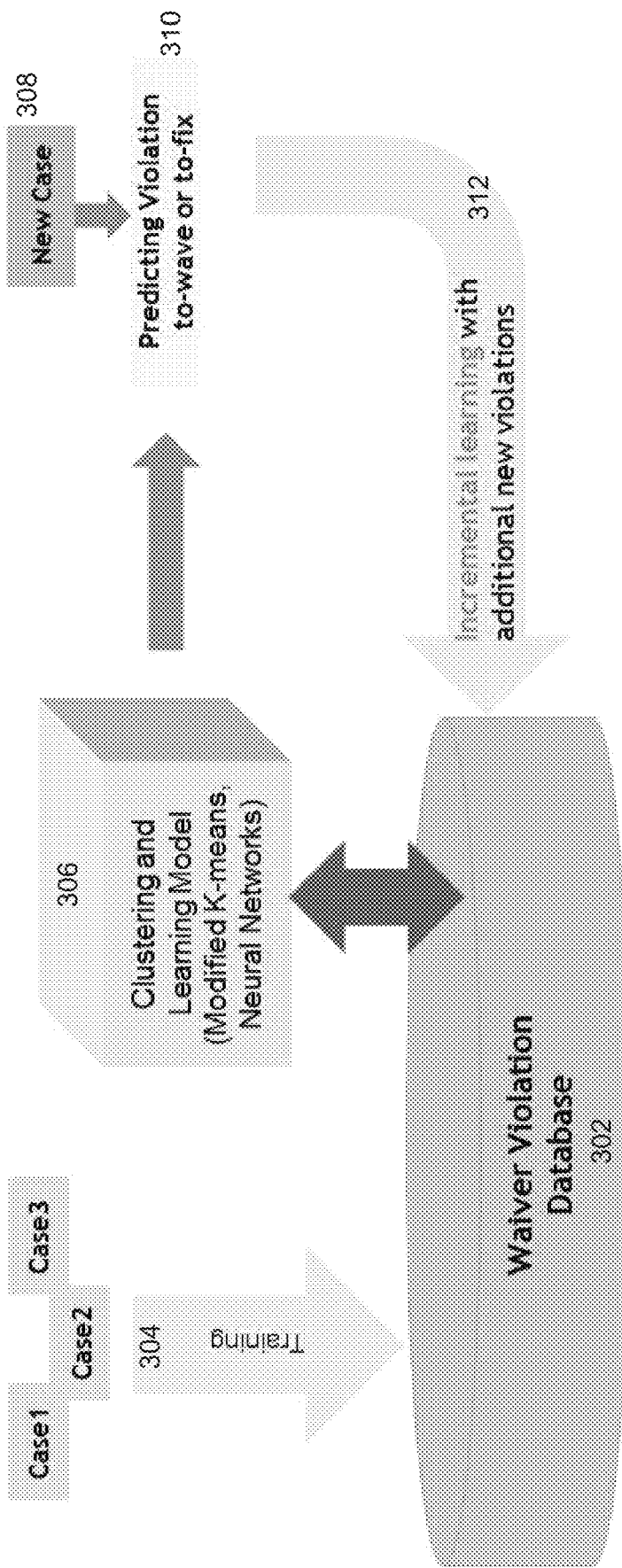
FIG. 3 is a diagram depicting an example system for analyzing historic engineering rule violation waivers to generate a model for automatically addressing at least a portion of future engineering rule violations.

FIG. 3 is a diagram depicting an example system for analyzing historic engineering rule violation waivers to generate a model for automatically addressing at least a portion of future engineering rule violations. A waiver violation database 302 is populated with details of a number of historic engineering rule violations 304 and the corresponding waiver decisions by the engineer. A clustering algorithm is performed at 306 to generate a model for assessing future engineering rule violations to determine whether those violations can be automatically waived without having to trouble the designing engineer for a waiver decision (e.g., where similar rule violations are always or almost always waived by the engineer in the past, the model assumes that the current violation can be automatically waived). In the example of FIG. 3, a modified K-means clustering algorithm that utilizes a neural network is used to form the model. The model is then put into operation, where a new engineering rule violation is received at 308 and a decision whether to automatically waive the violation is made at 310. If the violation is automatically waived, then no indication of the violation is presented to the engineer. If the violation is deemed to not be waivable, the design rule violation is presented to the engineer (e.g., as a warning) for possible correction or manual waiver. The engineers subsequent action relative to the engineering rule violation can be used to update the model, as indicated at 312, such as through an updated training of the model 306 using: the new rule violation 308, the automated waiver decision 310, and the engineer's subsequent activity (in alignment with or contrary to the automated decision 310).

Figure 4:
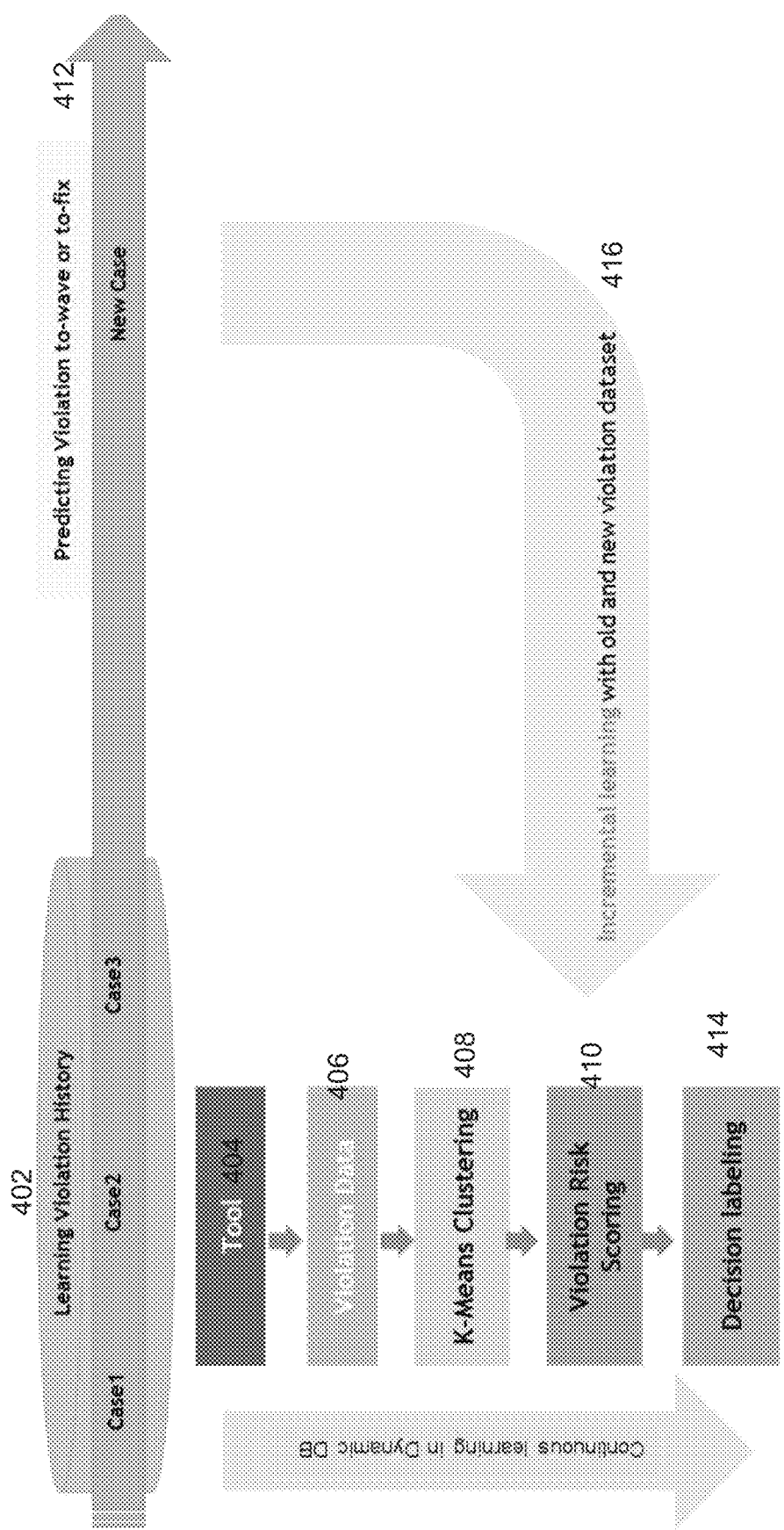
FIG. 4 is a diagram depicting example steps of an automated engineering design rule violation waiver model.

FIG. 4 is a diagram depicting example steps of an automated engineering design rule violation waiver model. A violation history repository 402 contains data associated with past engineering rule violations and whether those violations were waived. Specifically, a design evaluation tool 404 (e.g., a tool for evaluating whether engineering design rules are violated by an offered design in an engineering design software application) identifies instances where engineering design rules are violated. Details of that rule violation (e.g., which rule was violated, by how much that rule was violated) along with whether the engineer chose to waive that rule violation is stored and accessed in model formation as violation data 406. In the embodiment of FIG. 4, a K-means clustering algorithm is performed at 408 to group the historic design rule violations. This grouping improves system performance when live design rule violations are being examined by the system because, when millions of live violations are being analyzed, it may be computationally infeasible to compare each live violation to all historic violations stored in the repository 402. Instead, each live violation is compared to characteristics of the more limited number of violation clusters.

Once the clusters are formed, the decisions of whether the engineer chose to waive the violations in each cluster are used to assign a risk score to that cluster at 410. For example, if the engineer waived all of the violations in a particular cluster, then that particular cluster is likely low risk and is assigned a low risk score. When a future design rule violation falls with that particular cluster, it will usually if not always be automatically waived. Conversely if a second cluster contains historical violations that were seldom waived, that second cluster may be deemed high risk, where future violations deemed most similar to the second cluster are seldom or never automatically waived.

At 412, new design rule violations are received. The system identifies to which cluster that new case is most similar, and the risk score associated with the most similar cluster is used to label the new case as being waivable or not waivable, as shown at 414. That new case 412, and whether the engineer took any action contrary to that automated waiver decision, can be used to further train the automatic waiver model.

Figure 5:
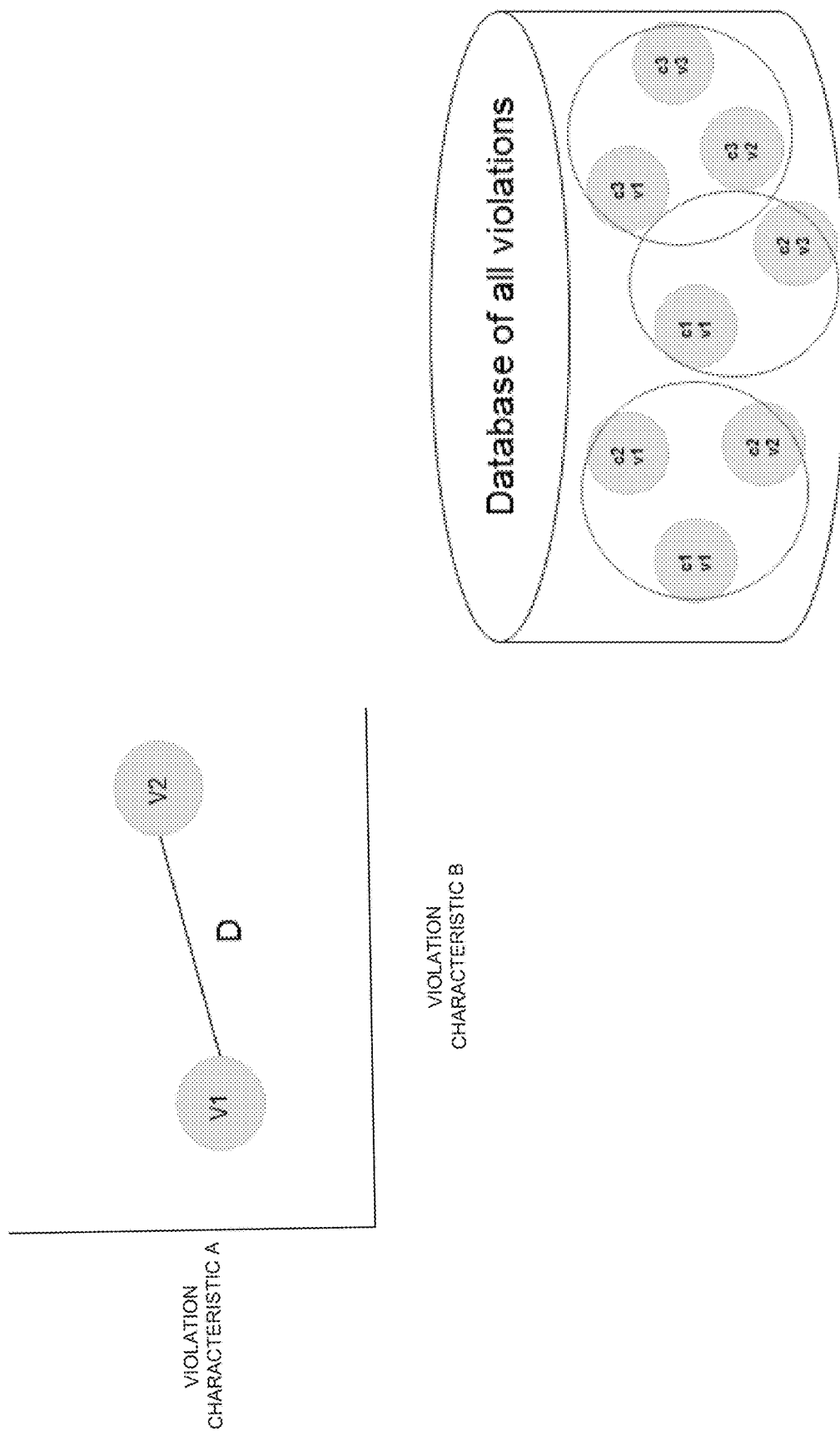
FIG. 5 is a diagram depicting clustering of historic violations stored in the historic violation determination repository.

FIG. 5 is a diagram depicting clustering of historic violations stored in the historic violation determination repository. As noted above, clustering can improve processing speed of a system, especially in cases where large numbers of current design rule violations (e.g., millions) need to be evaluated. That is, rather than comparing (e.g., performing a distance calculation) a current violation to each historic violation (e.g., millions, tens of millions) to determine to which it is most similar, a system can compare the current violation to characteristics of clusters of historic violations (e.g., to average characteristics of historic violations deemed in the cluster), substantially limiting the number of comparisons that need to be made.

Clustering is performed based on characteristics of historic violations (e.g., the type of violation, the magnitude of a parameter relative to the design rule threshold (i.e., by how much the rule was violated)). Distances between historic violations are calculated to identify groups of historic violations that have similar characteristics. Those distance calculations could be Euclidean distances or other custom distance calculations. In a Euclidean distance embodiment, a weight (W) assigned to each violation characteristic ($X_n$) of each historic violation ($V_n$) is equal. A K-means clustering algorithm is then performed based on calculated distances between violations in the historic violation decision repository.

Figure 6:
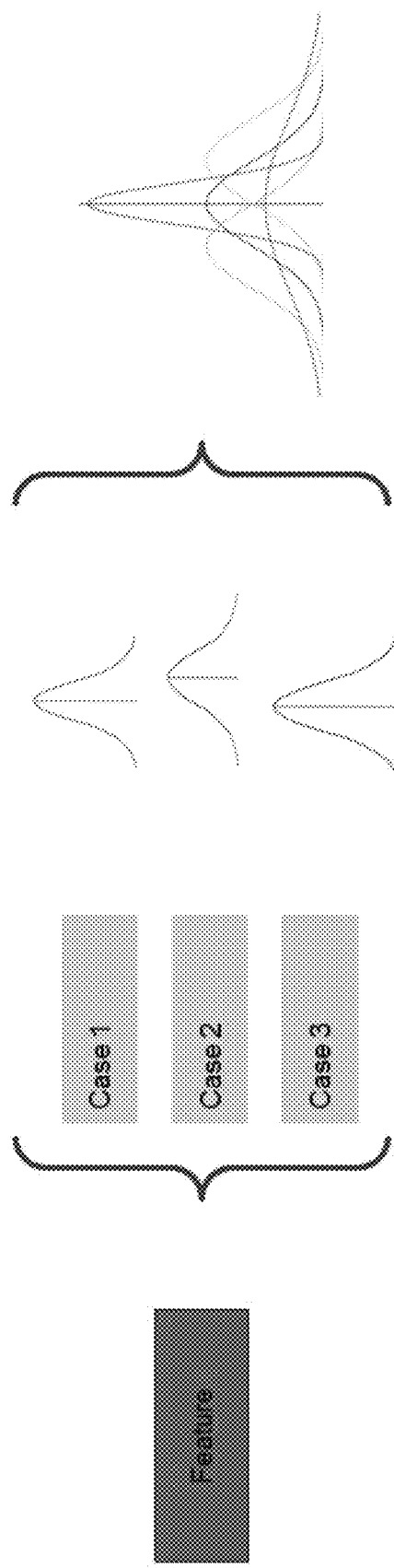
FIG. 6 is a diagram depicting global normalization of features across multiple cases.

Prior to calculating those distances, violation characteristics may be normalized per case (e.g., according to a Gaussian distribution). To generalize for other cases, distributions across all designs can be superimposed to provide global normalized features. FIG. 6 is a diagram depicting global normalization of features across multiple cases.

In certain embodiments described herein, different features are assigned different weights (i.e., the K-means clustering algorithm does not use straight Euclidean distances). In this example, a weight ($W_n$) assigned to each violation characteristic ($V_n$) is potentially different. In such an example, to calculate a distance between two violations ($V_1$ and $V_2$), an algorithm (1) determines values for each of the violation characteristics ($X_n$) for each of the violations; (2) accesses weights ($W_n$) for those violation characteristics, and (3) calculates the distance between the violations ($V_1$ and $V_2$) according to $D=W^T(X_1-X_2)$.

Figure 7:
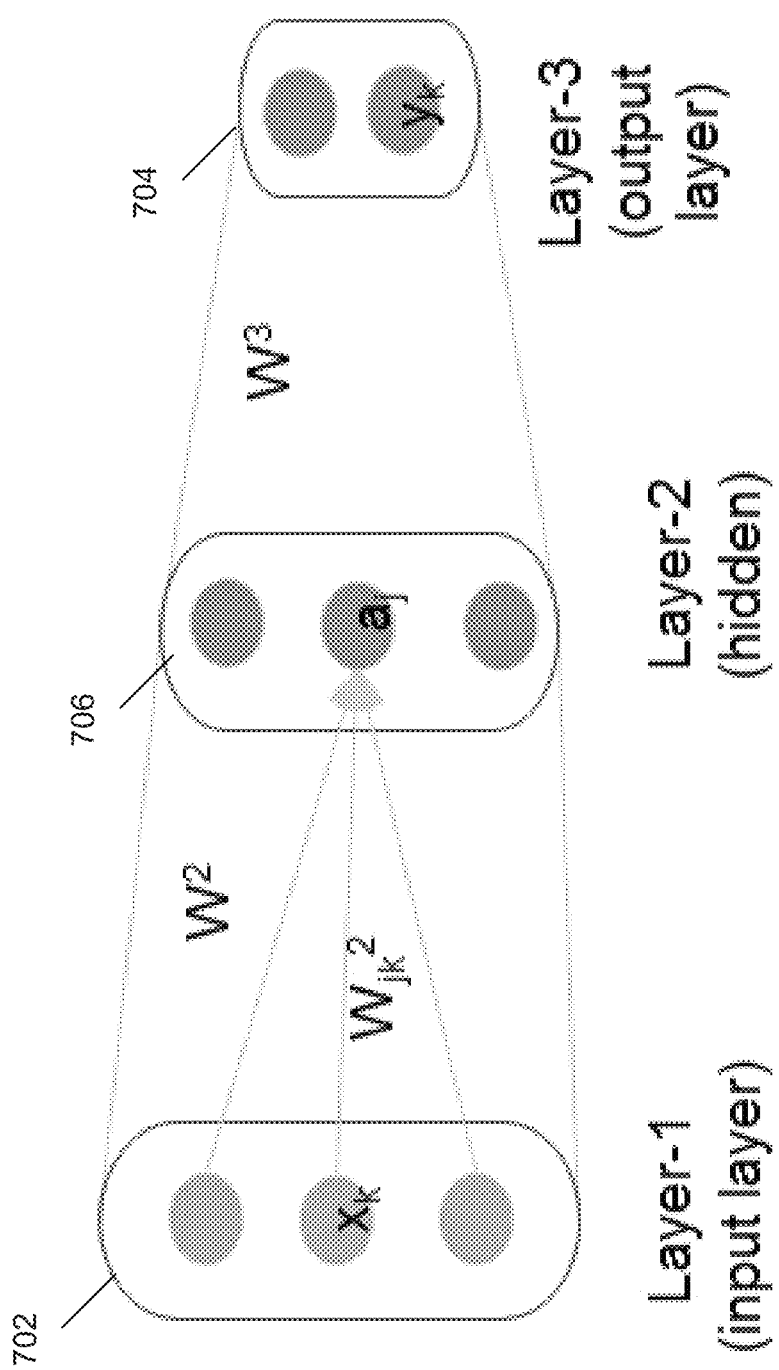
FIG. 7 is a diagram depicting an example neural network for determining violation feature-specific weights.

In one embodiment, the feature-specific weights are assigned using a neural network. FIG. 7 is a diagram depicting an example neural network for determining violation feature-specific weights. A first layer of the neural network 702 is an input layer that accepts the feature weights for a particular violation. An output layer 704 provides a recommendation for whether a particular violation should be automatically waived. One or more hidden layers 706 may also be included in the decision making hierarchy for the neural network, with weights being assigned between layers of the model. Initial weights may be set equal (e.g., to a value of 1) or the initial weights may be set by a user. The neural network can then be used to train and fine tune the learning weights.

In one embodiment, a confusion matrix can be utilized to evaluate the performance of the neural network training to determine whether additional training is worthwhile. FIG. 8 is a diagram depicting an example confusion matrix. In the example of FIG. 8, counts of each of four categories of performance by the neural network are tracked—comparing model performance to actual waiver decisions made for the historic design rule violations. The confusion matrix of FIG. 8 identifies what is considered a True Positive, a False Positive, a False Negative, and a True Negative. Those count values are used to determine a Recall and a Precision metric for the model. The Recall and Precision metrics, alone or in combination, can be compared to one or more thresholds to determine how well the model is performing. When performance meets or surpasses a desired level, further training is suspended. But, if performance is less than desired, further training can be performed through analysis of additional historic design rule violations and their associated engineer waiver decisions.

Systems and methods as described herein can improve the function of the computer by providing software code and data structures that provide for automation of design rule violation waivers that previously could only be handled through manual user intervention. This automation speeds a process that previously required hours or days of computing to one that can be substantially performed in seconds or minutes. In some embodiments, all design rule violations are still noted and considered by the systems and methods described herein (e.g., identifying a cluster for the violation and making a waiver decision based on the clustering), such that those systems and methods are not merely a simplification or heuristic of the rule violation waiver decision process.

Systems and methods as described herein may also be used in a process of building, fabricating, or adjusting the configuration of a real-world physical object. In one example, a design for an electronic circuit is accessed for analysis. Design rule violations for that design are identified, where certain of those design rule violations are automatically waived. The design for the electronic circuit is then modified based on one or more non-waived violations, where in some embodiments the modification to the design is automatic. The electronic circuit is then built/fabricated, or an existing electronic circuit is adjusted based on the modified design. In one example, the initial design and characteristics of the electronic circuit are determined based on one or more observations and/or measurements of a real-world physical electronic circuit.

The present disclosure provides many different embodiments, or examples, for implementing different features of the invention. Specific examples of components and arrangements are described herein to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

For example, the systems and methods disclosed herein are configured to determine efficiency of various clock-gating conditions and implement latches efficiently. As an example, the systems and methods disclosed herein are configured to perform reduction of transparent periods of latches in an integrated circuit by using stability and observability based techniques. In some embodiments, the systems and methods disclosed herein are configured to analyze fan-in and fan-out cones of latches across multiple clock cycles to determine a set of conditions under which one or more latches are not required to be transparent and clock-gate the latches under these conditions in order to reduce power consumption of latch based design at register transfer level.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A processor-implemented method of reducing processing time of an automated engineering design, comprising:
    accessing a repository of engineering design rule violations and corresponding waiver decisions regarding the engineering design rule violations;
    performing a clustering operation on the accessed engineering design rule violations in the repository to form clusters of violations based on one or more characteristics of the engineering design rule violations;
    analyzing the waiver decisions associated with the engineering design rule violations in each cluster to assign a risk level to each cluster;
    identifying a plurality of detected engineering design rule violations associated with the automated engineering design;
    iterating through each of the detected engineering design rule violations to determine which cluster that detected engineering design rule violation belongs; and
    automatically waiving detected engineering design rule violations associated with low risk clusters for design approval.

2. The method of claim 1, wherein the clustering operation is a K-Means clustering operation.

3. The method of claim 1, wherein the clustering operation is performed by determining a distance between two engineering design rule violations in the repository based on the characteristics of those two engineering design rule violations;
   wherein the distance is determined by calculating a characteristic distance, for each of the characteristics, by calculating a difference between values for that characteristic for the two engineering design rule violations multiplied by a weight for that characteristic.

4. The method of claim 3, wherein the distance between the two engineering design rule violations is a Euclidean distance determined using the characteristic distances.

5. The method of claim 3, wherein the weights for the characteristic are determined using a neural network.

6. The method of claim 5, wherein weights for each characteristic are initially set at a common value, wherein the weights for each characteristic are adjusted by:
   inputting a prior engineering design rule violation to the neural network to determine a waiver prediction;
   determining whether the waiver prediction matches a waiver decision associated with the prior engineering design rule violation;
   adjusting the weights for the characteristics based on the accuracy metric.

7. The method of claim 5, further comprising:
   determining an accuracy metric based on predictions made by the neural network; and
   continuing to adjust the weights for each characteristic when the accuracy metric does not indicate a level of accuracy that meets an accuracy threshold.

8. The method of claim 7, wherein the accuracy metric includes a recall metric and a precision metric.

9. The method of claim 8, wherein the recall metric is calculated according to:

Recall=TP/(TP+FN), where TP is a count of true positives where the waiver prediction and the waiver decision both indicate an engineering design rule violation waiver, and where FN is a count of false negatives where the waiver prediction indicates no engineering design rule violation waiver and the waiver decision indicates an engineering design rule violation waiver;
   wherein the precision metric is calculated according to:

Precision=TP/(TP+FP), where FP is a count of false positives where the waiver prediction indicates an engineering design rule violation waiver and the waiver decision indicates no engineering design rule violation waiver.

10. The method of claim 1, wherein the engineering design rule violations are associated with electromigration design rules, wherein the electromigration design rules indicate parameters of wire configurations that are not permitted in order to mitigate electromigration damage to a circuit.

11. The method of claim 1, wherein the engineering design rule violations are associated critical path timing violations in a circuit.

12. The method of claim 1, wherein the engineering design rule violations are associated with dynamic voltage drops in a circuit.

13. The method of claim 1, wherein engineering design rule violations that are not automatically waived are presented to a designer for manual waiver decisions.

14. The method of claim 1, wherein the plurality of detected engineering design rule violations includes more than one million detected engineering design rule violations.

15. The method of claim 1, wherein the automatically waiving results in an engineering design that utilizes less resources than a design where the detected engineering design rule violations were not waived.

16. The method of claim 1, wherein an engineering system is built based on the automated engineering design including aspects of the engineering design that violated engineering design rules, where those violated engineering design rules were automatically waived.

17. A system for reducing processing time of an automated engineering design, comprising:
   one or more data processors;
   a computer-readable medium encoded with instructions for commanding the one or more data processors to execute steps of a process, wherein the steps include:
      accessing a repository of engineering design rule violations and corresponding waiver decisions regarding the engineering design rule violations;
      performing a clustering operation on engineering design rule violations in the repository to form clusters of engineering design rule violations based on one or more characteristics of the engineering design rule violations;
      analyzing the waiver decisions associated with engineering design rule violations in each cluster to assign a risk level to each cluster;
      identifying a plurality of detected engineering design rule violations associated with the engineering design;
      iterating through each of the detected engineering design rule violations to determine which cluster that detected engineering design rule violation belongs; and
      automatically waiving detected engineering design rule violations associated with low risk clusters for design approval.

18. The system of claim 17, wherein the clustering operation is a K-Means clustering operation.

19. The system of claim 17, wherein the clustering operation is performed by determining a distance between two engineering design rule violations in the repository based on the characteristics of those two engineering design rule violations;
   wherein the distance is determined by calculating a characteristic distance, for each of the characteristics, by calculating a difference between values for that characteristic for the two violations multiplied by a weight for that characteristic.

20. A non-transitory computer-readable medium encoded with instructions for commanding one or more data processors to execute a method of reducing processing time of an automated engineering design, steps of the method comprising:
   accessing a repository of engineering design rule violations and corresponding waiver decisions regarding the engineering design rule violations;
   performing a clustering operation on engineering design rule violations in the repository to form clusters of engineering design rule violations based on one or more characteristics of the engineering design rule violations;
   analyzing the waiver decisions associated with engineering design rule violations in each cluster to assign a risk level to each cluster;
   identifying a plurality of detected engineering design rule violations associated with the engineering design;

iterating through each of the detected engineering design rule violations to determine which cluster that detected engineering design rule violation belongs; an automatically waiving detected engineering design rule violations associated with low risk clusters for design approval.

\* \* \* \* \*